United States Patent
Koiwai

(10) Patent No.: US 10,009,498 B2
(45) Date of Patent: Jun. 26, 2018

(54) PRINTING APPARATUS AND METHOD FOR CONTROLLING PRINTING APPARATUS

(71) Applicant: Seiko Epson Corporation, Tokyo (JP)

(72) Inventor: Masahiro Koiwai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days. days.

(21) Appl. No.: 15/341,425

(22) Filed: Nov. 2, 2016

(65) Prior Publication Data

US 2017/0142280 A1    May 18, 2017

(30) Foreign Application Priority Data

Nov. 12, 2015  (JP) .................................. 2015-221878

(51) Int. Cl.
*G06K 15/00* (2006.01)
*H04N 1/00* (2006.01)

(52) U.S. Cl.
CPC ..... *H04N 1/00899* (2013.01); *H04N 1/00037* (2013.01); *H04N 1/00079* (2013.01); *H04N 1/00204* (2013.01); *H04N 1/00901* (2013.01)

(58) Field of Classification Search
CPC .......... H04N 1/00899; H04N 1/00901; H04N 1/00079; H04N 1/00037; H04N 1/00204
USPC ....................................... 358/1.14
See application file for complete search history.

(56) References Cited

U.S. PATENT DOCUMENTS

| | | | |
|---|---|---|---|
| 9,204,000 B2 * | 12/2015 | Narushima | ........ H04N 1/00901 |
| 2013/0286419 A1 | 10/2013 | Mochizuki | |
| 2014/0019783 A1 * | 1/2014 | Ooba | ........................ G06F 1/26 |
| | | | 713/300 |
| 2014/0029040 A1 * | 1/2014 | Tsuji | ................... H04N 1/00339 |
| | | | 358/1.14 |
| 2015/0153978 A1 * | 6/2015 | Ito | .......................... G06F 3/1236 |
| | | | 358/1.15 |
| 2016/0328186 A1 * | 11/2016 | Anei | ...................... G06F 3/126 |

FOREIGN PATENT DOCUMENTS

| | | |
|---|---|---|
| JP | 2001-142361 A | 5/2001 |
| JP | 2007-243547 A | 9/2007 |
| JP | 2007-320051 A | 12/2007 |
| JP | 4184247 B2 | 9/2008 |
| JP | 2012-175496 A | 9/2012 |
| JP | 2013-228513 A | 11/2013 |

OTHER PUBLICATIONS

Ko et al.; JP 2007-243547; Image Processing Apparatus, Start Control Method Thereof and Program; Published Sep. 20, 2007; English translation provided by Applicant.*

* cited by examiner

*Primary Examiner* — Neil R McLean

(74) *Attorney, Agent, or Firm* — Workman Nydegger

(57) ABSTRACT

A printing apparatus to which a remote terminal is connectable via a communication line such as the Internet includes a communication interface configured to perform data communication with the remote terminal, and a communication module configured to control the communication interface. At a power supply restart after a power shutdown state, the communication module transmits information of the power supply restart to the remote terminal.

7 Claims, 4 Drawing Sheets

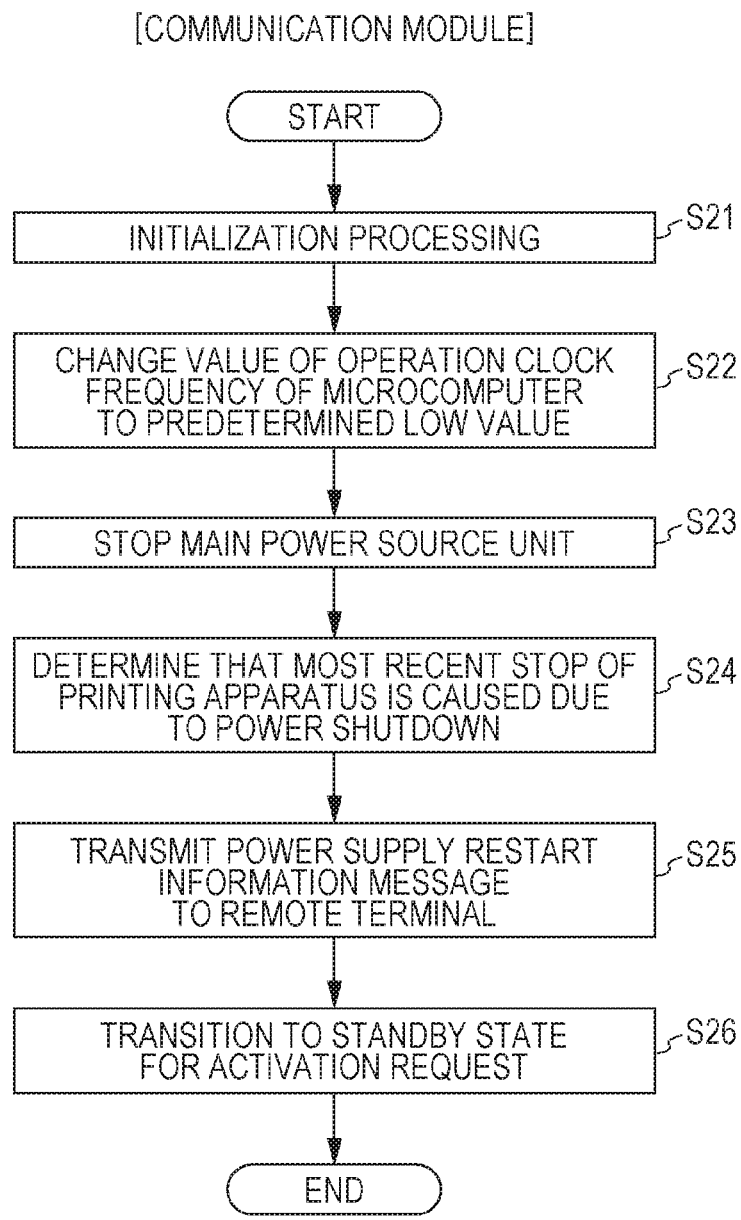

PRINTING APPARATUS AND METHOD FOR CONTROLLING PRINTING APPARATUS

BACKGROUND

1. Technical Field

The present invention relates to a printing apparatus for performing printing on a print medium and a method for controlling the printing apparatus.

2. Related Art

A known printing apparatus (image forming apparatus) is an apparatus including a printer engine that includes a print control section, nonvolatile memory for storing power source transition information representing the ON/OFF state of a power source for the apparatus switched by a soft switch, and a controller configured to determine whether or not the power source transition information represents the ON state when feeding of power is started, wherein the controller allows power to be supplied to the printer engine when it is determined that the power source transition information represents the ON state (see JP-A-2012-175496). That is, in the printing apparatus, the controller determines, based on the power source transition information, whether or not a power supply start is a start after a power shutdown of the apparatus due to a blackout, or the like, and when the power supply start is a start after the power shutdown, the controller allows power to be supplied to the printer engine. In this way, when power supply is restarted after a power shutdown, the controller allows power to be supplied to the printer engine, thereby avoiding a situation where the printer engine remains in a stopped state when the power supply is restarted.

There is a demand for connecting a remote terminal via a communication line to such a printing apparatus so as to monitor the printing apparatus by using the remote terminal. In particular, a printing apparatus such as a wide format printer is continuously operated. Therefore, there is a demand for enabling the printing apparatus to be monitored from a remote location by using a remote terminal during the continuous operation of the apparatus. To meet this demand, a communication section configured to perform communication with the remote terminal may be added to the configuration of the known printing apparatus to enable communication with the remote terminal. However, such a configuration has a problem that when the power supply is restarted after the power shutdown, a user of the remote terminal is not aware of this event. That is, if a user monitors the printing apparatus while in proximity to the printing apparatus, when the power supply is restarted after the power shutdown, the user will be well aware of this event, but if the user monitors the printing apparatus from a remote location by using the remote terminal, the user will not be aware of this event.

SUMMARY

An advantage of some aspects of the present invention is to provide a printing apparatus in which when a power supply restart after a power shutdown state occurs, a user of a remote terminal is made aware of this event, and to provide a method for controlling the printing apparatus.

A printing apparatus according to an aspect of the invention is a printing apparatus to which a remote terminal is connectable via a communication line, and the printing apparatus includes: a communication section configured to perform data communication with the remote terminal; and a communication control section configured to control the communication section, wherein at a power supply restart after a power shutdown state, the communication control section transmits information of the power supply restart to the remote terminal.

A method for controlling a printing apparatus according to an aspect of the invention is a method for controlling a printing apparatus including a communication section configured to perform data communication with a remote terminal via a communication line, the method including: transmitting to the remote terminal, by using the communication section at a power supply restart after a power shutdown state, information of the power supply restart.

With these configurations, at a power supply restart after a power shutdown state, information of the power supply restart is transmitted to the remote terminal. Therefore, at the power supply restart after the power shutdown state, a user of the remote terminal can be made aware of this event (that the power supply has restarted after the power shutdown). Thus, the user of the remote terminal can rapidly respond to this event, and for example, it is possible to reduce downtime due to the power shutdown as much as possible.

The printing apparatus preferably includes a print section configured to perform printing on a print medium; a print control section configured to control the print section; a main power source section configured to supply supplied power to the print control section; and a sub-power source section configured to supply supplied power to the communication control section, wherein the communication control section is supplied with power from the sub-power source section at the power supply restart, with the main power source section being in a stopped state, to transmit the information of the power supply restart to the remote terminal.

With this configuration, the information of the power supply restart can be transmitted to the remote terminal with the main power source section remaining in a stopped state. That is, the information of the power supply restart can be transmitted to the remote terminal with the print section and the print control section being in a fully stopped state.

In this case, the communication control section preferably transmits the information of the power supply restart to the remote terminal and then activates the main power source section in response to an activation request from the remote terminal.

With this configuration, the communication control section stands by for the activation request from the remote terminal and then activates the main power source section. Therefore, a user of the remote terminal can confirm that the printing apparatus is in a normal state, and then, the main power source section can be activated.

Here, the information of the power supply restart preferably includes error information at the time of the power supply restart.

With this configuration, a user of the remote terminal is made aware of the error information of the printing apparatus at the power supply restart. Thus, at the power supply restart, the error status of the printing apparatus can be rapidly resolved, and operation of the printing apparatus can be rapidly resumed.

Here, when a power shutdown occurs, the communication control section preferably transmits information of the power shutdown to the remote terminal.

With this configuration, when a power shutdown occurs, a user of the remote terminal is made aware of this event (that a power shutdown has occurred).

BRIEF DESCRIPTIONS OF THE DRAWINGS

The invention will be described with reference to the accompanying drawings, wherein like numbers reference like elements.

FIG. 4 is a flowchart illustrating operation at a power supply restart.

DESCRIPTION OF EXEMPLARY EMBODIMENTS

With reference to the attached drawings, a printing apparatus according to an embodiment of the present invention and a method for controlling the printing apparatus will be described below. The embodiment illustrates a printing system including a printing apparatus to which the invention has been applied. The printing system is configured to perform printing on a print medium by using the printing apparatus to produce printed material, and is configured to be capable of monitoring the printing apparatus by using a remote terminal connected to the printing apparatus through the Internet. In particular, the printing system is configured to, on the occurrence of a power shutdown due to a blackout, or the like, or at the power supply restart after the power shutdown, notify a user of the remote terminal of such events.

Figure 1:
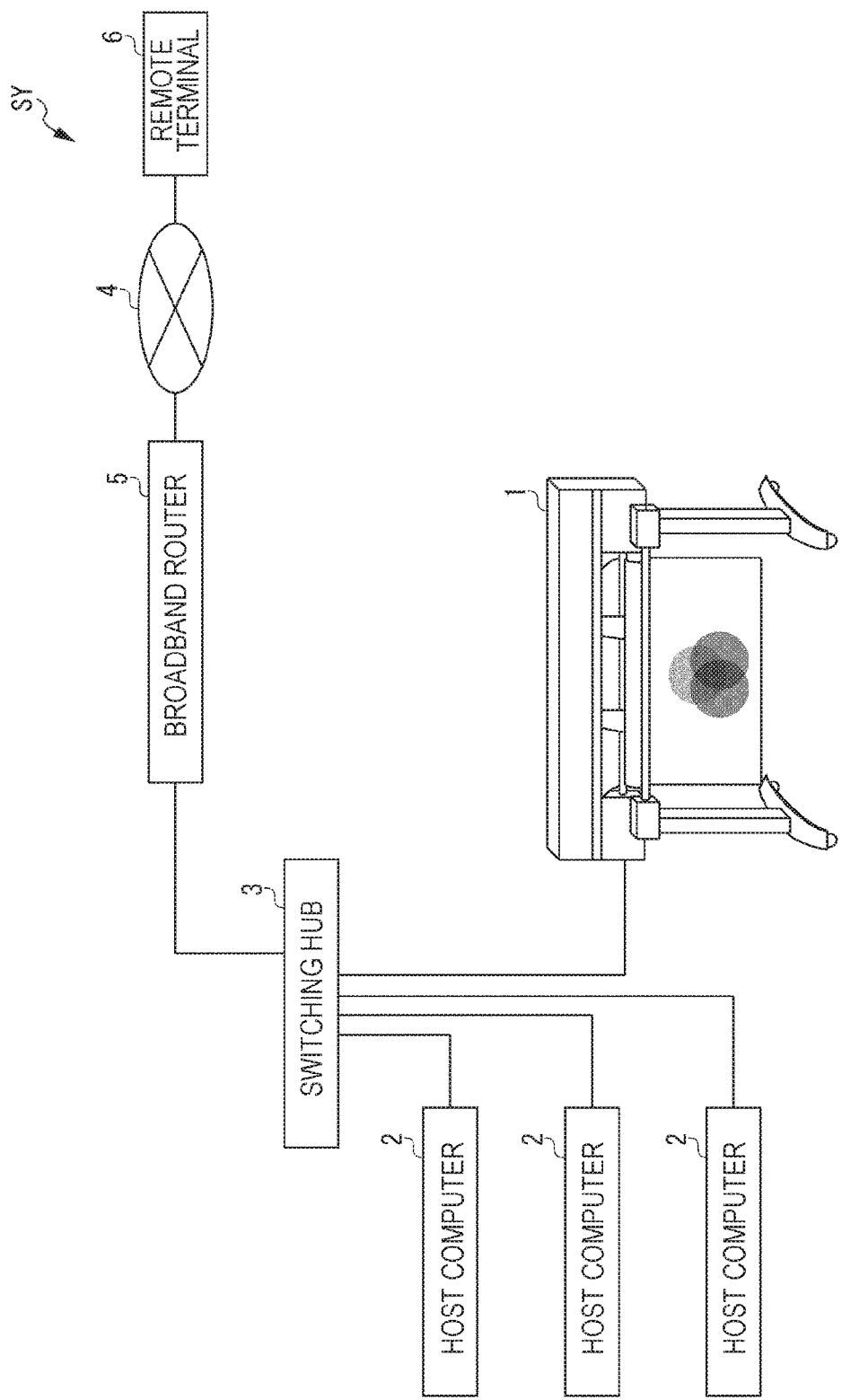
FIG. 1 is a system configuration diagram illustrating a printing system according to an embodiment of the present invention.

As illustrated in FIG. 1, a printing system SY includes a printing apparatus 1 including a wide format printer, a plurality of host computers 2 serving as host devices of the printing apparatus 1, a switching hub 3 (Ethernet switch) connecting the printing apparatus 1 to the plurality of host computers 2 to establish a local area network (LAN), a broadband router 5 connected to the switching hub 3 to connect the LAN to the Internet 4 (effectively a communication line), and a remote terminal 6 connected to the printing apparatus 1 via the LAN, the broadband router 5, and the Internet 4 (Ethernet is a registered trademark). That is, the plurality of host computers 2 are connected to the printing apparatus 1 via the LAN, and the remote terminal 6 is connected to the printing apparatus 1 via the LAN and the Internet 4.

As each of the host computers 2, a general personal computer can be used. Each of the host computers 2 serves as a host device of the printing apparatus 1. That is, each host computer 2 transmits various requests to the printing apparatus 1 and receives various types of information from the printing apparatus 1. Specifically, each host computer 2 transmits mainly a print request containing print data to the printing apparatus 1 to allow the printing apparatus 1 to perform printing.

As the remote terminal 6, a general personal computer or a smart device can be used. The remote terminal 6 is a terminal for monitoring the printing apparatus 1 from a remote location. The remote terminal 6 transmits various requests to the printing apparatus 1 and receives various types of information from the printing apparatus 1. Moreover, the remote terminal 6 includes a display section to display the various types of information obtained from the printing apparatus 1. Specifically, the remote terminal 6 transmits mainly a status request to the printing apparatus 1, and in response to the status request, the remote terminal 6 obtains status information of the printing apparatus 1 transmitted from the printing apparatus 1. Then, the obtained status information is displayed by the display section.

Figure 2:
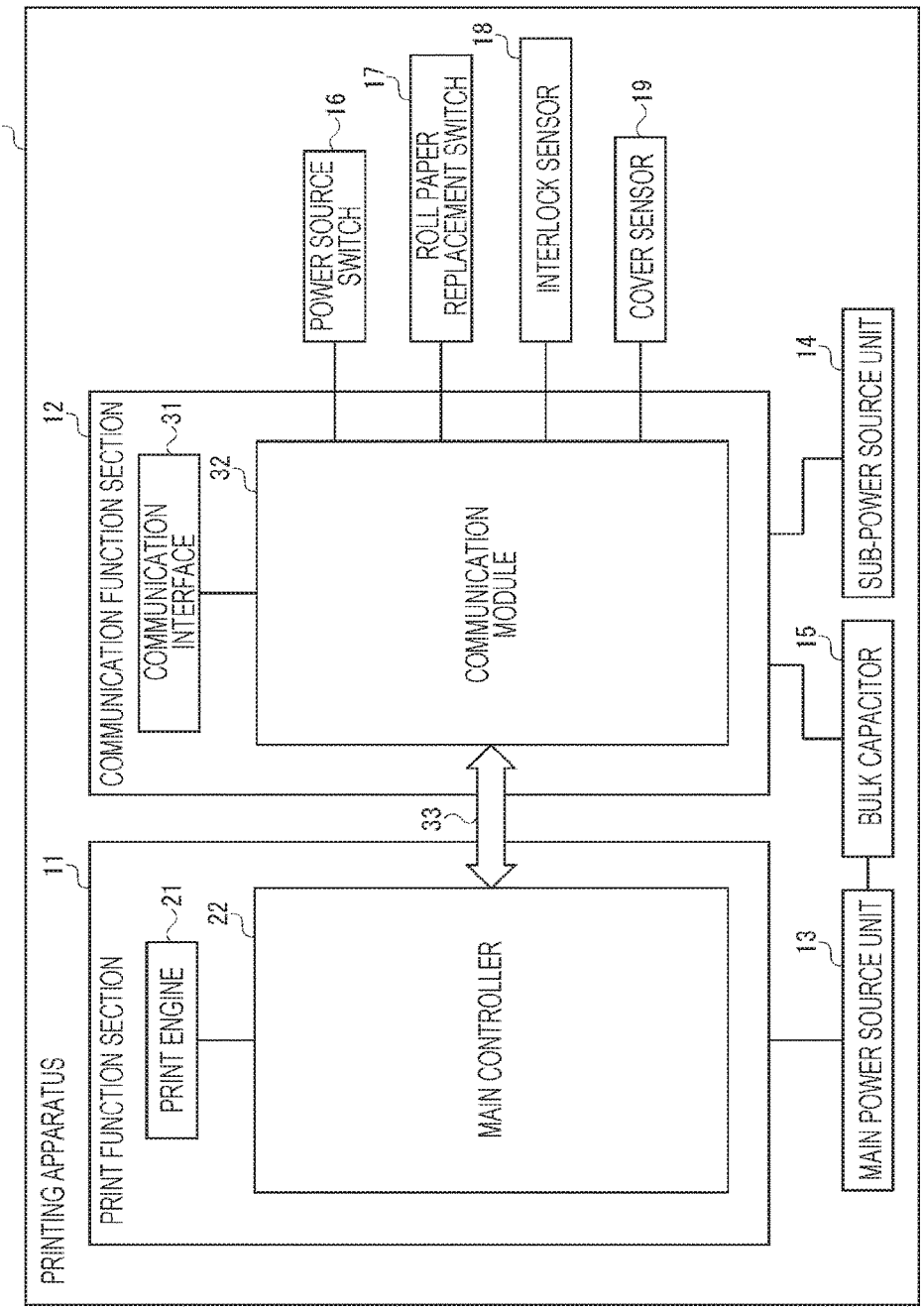
FIG. 2 is a block diagram illustrating the configuration of a printing apparatus.

As illustrated in FIG. 2, the printing apparatus 1 includes a print function section 11 that provides a print function, a communication function section 12 that provides a communication function, a main power source unit 13 (main power source section) configured to supply power to the print function section 11, a sub-power source unit 14 (sub-power source section) configured to supply power to the communication function section 12, and a bulk capacitor 15 serving as a backup power source for the communication function section 12. The printing apparatus 1 further includes a tact-type power source switch 16, a roll paper replacement switch 17, an interlock sensor 18, and a cover sensor 19 which are connected to the communication function section 12 (communication module 32 described later).

The print function section 11 includes a print engine 21 (print section) configured to perform printing on a print medium, and a main controller 22 (print control section) configured to control the print engine 21.

The print engine 21 uses large roll paper as a print medium and performs printing on the large roll paper to produce a large-format printed material. The print engine 21 includes, for example, a roll paper accommodation section configured to accommodate roll paper, a paper transport section configured to transport the accommodated roll paper along a transportation passage, and a print section configured to perform ink jet printing on the print medium which is being transported.

The main controller 22 is a control circuit configured to control the print engine 21 and includes a high-performance CPU, a large-capacity semiconductor memory, a mass storage (HDD/SSD) device, image processing hardware, a DMA controller, a mechanical controller microcomputer, a motor driving driver, an actuator driving driver, an on-board power source generation circuit, and the like. The main controller 22 supplies power from the main power source unit 13 to the print engine 21, controls the print engine 21, and performs printing on a print medium based on print data received from the communication function section 12.

The main power source unit 13 supplies externally supplied power to the print function section 11. That is, the main power source unit 13 supplies supplied power to the print function section 22. The main power source unit 13 is capable of supplying power at a high voltage of 42 V and at a logic system voltage of 5 V. Moreover, the main power source unit 13 is connected to the bulk capacitor 15 to charge the bulk capacitor 15. Thus, when the main power source unit 13 is activated, the bulk capacitor 15 is charged.

The sub-power source unit 14 is a power source unit capable of operating independently of the main power source unit 13. The sub-power source unit 14 supplies externally supplied power to the print function section 12. That is, the main power source unit 14 supplies supplied power to the communication module 32, which will be described later. The main power source unit 14 is capable of supplying power at a logic system voltage of 5 V.

The bulk capacitor 15 is charged by the main power source unit 13 and serves as a backup power source for the communication function section 12. Specifically, when a power shutdown occurs (when supplying of power to the printing apparatus 1 is interrupted), the bulk capacitor 15, instead of the sub-power source unit 14, supplies power to the communication function section 12 (communication module 32 described later). Note that the communication function section 12 may be supplied with power generally from the main power source unit 13, and may be supplied with power from the bulk capacitor 15 when a power shutdown occurs.

The communication function section 12 includes a communication interface 31 (communication section) configured to perform data communication with the host computers 2 and the remote terminal 6, and a communication module 32 (communication control section) configured to control the communication interface 31.

The communication interface 31 includes a Gigabit Ethernet port, and the like, performs data communication with the host computers 2 via a LAN, and performs communication with the remote terminal 6 via the LAN and the Internet 4.

The communication module 32 is a control circuit (sub controller) capable of operating independently of the main controller 22 and is configured to control the communication interface 31. The communication module 32 includes a 10/100/1000 Base Ethernet NIC controller, a DMA controller, a semiconductor memory (for example, NVRAM), a microcontroller capable of dynamically changing an operational clock frequency, and the like. The communication module 32 controls the communication interface 31 and performs data communication with the host computers 2 and the remote terminal 6. That is, the communication module 32 receives various requests from the host computers 2 and the remote terminal 6 via the communication interface 31, and transmits various types of information to the host computers 2 and the remote terminal 6. For example, the communication module 32 receives a print request from the host computer 2. Moreover, for example, the communication module 32 receives a status request from the host computer 2 and/or the remote terminal 6, and in response to the status request, the communication module 32 returns status information of the printing apparatus 1 to the host computer 2 and/or the remote terminal 6.

Moreover, the communication module 32 is connected to and monitors the tact-type power source switch 16, the roll paper replacement switch 17, the interlock sensor 18, and the cover sensor 19. That is, the communication module 32 obtains the operational information of the power source switch 16 and the roll paper replacement switch 17 and detection information of the interlock sensor 18 and the cover sensor 19.

Moreover, the communication module 32 is connected to the main controller 22 via a high-speed bus 33 to exchange information with the main controller 22. Specifically, the communication module 32 performs high-speed transfer of received print data to the main controller 22 and performs message communication with the main controller 22 via the communication interface 31.

Furthermore, the communication module 32 is connected to the main power source unit 13, outputs a main power source control signal to the main power source unit 13, and controls the activation/stop of the main power source unit 13. In addition to the function of controlling the activation/stop of the main power source unit 13 on reception of operation information of the power source switch 16, the communication module 32 has a function of switching the operation mode of the printing apparatus 1 between a normal mode in which the main power source unit 13 is in an active state and a power-saving standby mode and a remote start standby mode in which the main power source unit 13 is in a stopped state.

The normal mode refers to a mode in which the main power source unit 13 and the sub-power source unit 14 are brought into an active state to receive a print request from the host computer 2 so as to execute printing. That is, in the normal mode, when the communication module 32 receives the print request containing print data from the host computer 2, the communication module 32 transfers the print data to the main controller 22. Then, the main controller 22 performs printing with the print engine 21 based on the print data.

The power-saving standby mode refers to a mode in which the main power source unit 13 is stopped and the sub-power source unit 14 is brought into an active state to receive the print request from the host computer 2 to activate the main power source unit 13 so as to execute printing. That is, in the power-saving standby mode, when the communication module 32 receives the print request containing print data from the host computer 2, the communication module 32 activates the main power source unit 13 and thereafter transfers the print data to the main controller 22. Then, the main controller 22 performs printing with the print engine 21 based on the print data. In the power-saving standby mode, when the communication module 32 receives, from the host computer 2, a request to exit the power-saving standby mode, the communication module 32 activates the main power source unit 13 and transitions to the normal mode. On transition to the normal mode, the communication module 32 performs an initializing process of the print engine 21 to render the printing apparatus 1 ready to perform printing.

The remote start standby mode is a mode in which the main power source unit 13 is stopped, the sub-power source unit 14 is brought into an active state, and the main power source unit 13 is activated in response to an activation request from the remote terminal 6. That is, in the remote start standby mode, when the communication module 32 receives the activation request from the remote terminal 6, the communication module 32 activates the main power source unit 13 in response to the activation request and transitions to the normal mode. On transition to the normal mode, the communication module 32 performs an initializing process of the print engine 21 to render the printing apparatus 1 ready to perform printing in a manner similar to the case in the power-saving standby mode. This results in a state in which the print function section 11 can be operated, and when any printing process has been interrupted during the most recent operation of the print function section 11, the printing process which has been interrupted is restarted (resumption of operation). In the remote start standby mode, in order to reduce the power consumption as much as possible, power supply to the roll paper replacement switch 17, the interlock sensor 18, and the cover sensor 19 is terminated, and the communicate mode of the communication interface 31 is changed from "High Speed," which is the default setting, to "Full Speed."

In the power-saving standby mode and the remote start standby mode, the value of the operation clock frequency of a microcomputer in the communication module 32 is changed from a normal value to a predetermined low value lower than the normal value. This further reduces the power consumption in the power-saving standby mode and in the remote start standby mode.

However, in such a printing apparatus 1, when a power shutdown (interruption of external power supply) stops the printing apparatus 1 and when supplying of power is restarted thereafter, a user of the remote terminal 6 is not aware of this event. In contrast, the present printing apparatus 1 has a function with which when a power shutdown occurs and when supplying of power is restarted after the power shutdown, the communication module 32 notifies the remote terminal 6 of these events.

Specifically, when the printing apparatus 1 is stopped due to a power shutdown (hereinafter referred to as at a power shutdown), the communication module 32 transmits a message including information of the power shutdown (hereinafter referred to as a power shutdown information message) to the remote terminal 6 to notify the remote terminal 6 of the information of the power shutdown. For example, the communication module 32 transmits to the remote terminal 6 a power shutdown information message including that the printing apparatus 1 has stopped due to the power shutdown and the power shutdown occurrence time as information of the power shutdown. Then, a user of the remote terminal 6 checks the transmitted power shutdown information message displayed by the display section, thereby becoming aware that the printing apparatus 1 has stopped due to the power shutdown and the power shutdown occurrence time.

Note that at the power shutdown, power supply from the sub-power source unit 14 is stopped, and therefore, the communication module 32 is supplied with power from the bulk capacitor 15, instead of the sub-power source unit 14, to perform message transmission. That is, power supply to the communication module 32 is switched from the sub-power source unit 14 to the bulk capacitor 15 to perform the message transmission.

Moreover, at a power supply restart after a power shutdown state (hereinafter referred to as at a power supply restart), the communication module 32 transmits to the remote terminal 6 a message including information of the power supply restart (hereinafter referred to as a power supply restart information message) to notify the remote terminal 6 of the information of the power supply restart. For example, as the information of the power supply restart, the power supply restart information message including that the power supply has been restarted and error information (error information of the printing apparatus 1) at the power supply restart is transmitted to the remote terminal 6. Then, a user of the remote terminal 6 checks the transmitted message on the display section and becomes aware that the power supply has been restarted and an error state at the time of the power supply restart. The error information is acquired based on detection information of the interlock sensor 18 and/or the cover sensor 19, on information obtained from the main controller 22 at the power shutdown, etc. Moreover, the power supply restart information message preferably includes that a power shutdown occurred at the most recent stop, the power shutdown occurrence time, and a message transmission result at the power shutdown (a success or an error in the message transmission).

At the power supply restart, the communication module 32 is supplied with power from the sub-power source unit 14, with the main power source unit 13 being in a stopped state, to perform message transmission. Specifically, when power supply is restarted, the communication module 32 is supplied with power from the sub-power source unit 14, with the main power source unit 13 remaining in a stopped state, to perform message transmission, and after the message transmission, the communication module 32 transitions to the remote start standby mode. That is, the communication module 32 is configured to, after the message transmission, activate the main power source unit 13 in response to an activation request from the remote terminal 6. In the remote activation standby mode at the time of the power supply restart, the communication module 32 activates the main power source unit 13 in response to the activation request, and when the printing apparatus 1 is ready to perform printing after the initializing process of the print engine 21, the communication module 32 transmits to the remote terminal 6 a message that the printable is ready to perform printing. Note that when any error hinders the printing apparatus 1 from being ready to perform printing, the communication module 32 transmits to the remote terminal 6 a message that the printing apparatus 1 is not ready to perform printing due to an error.

Figure 3:
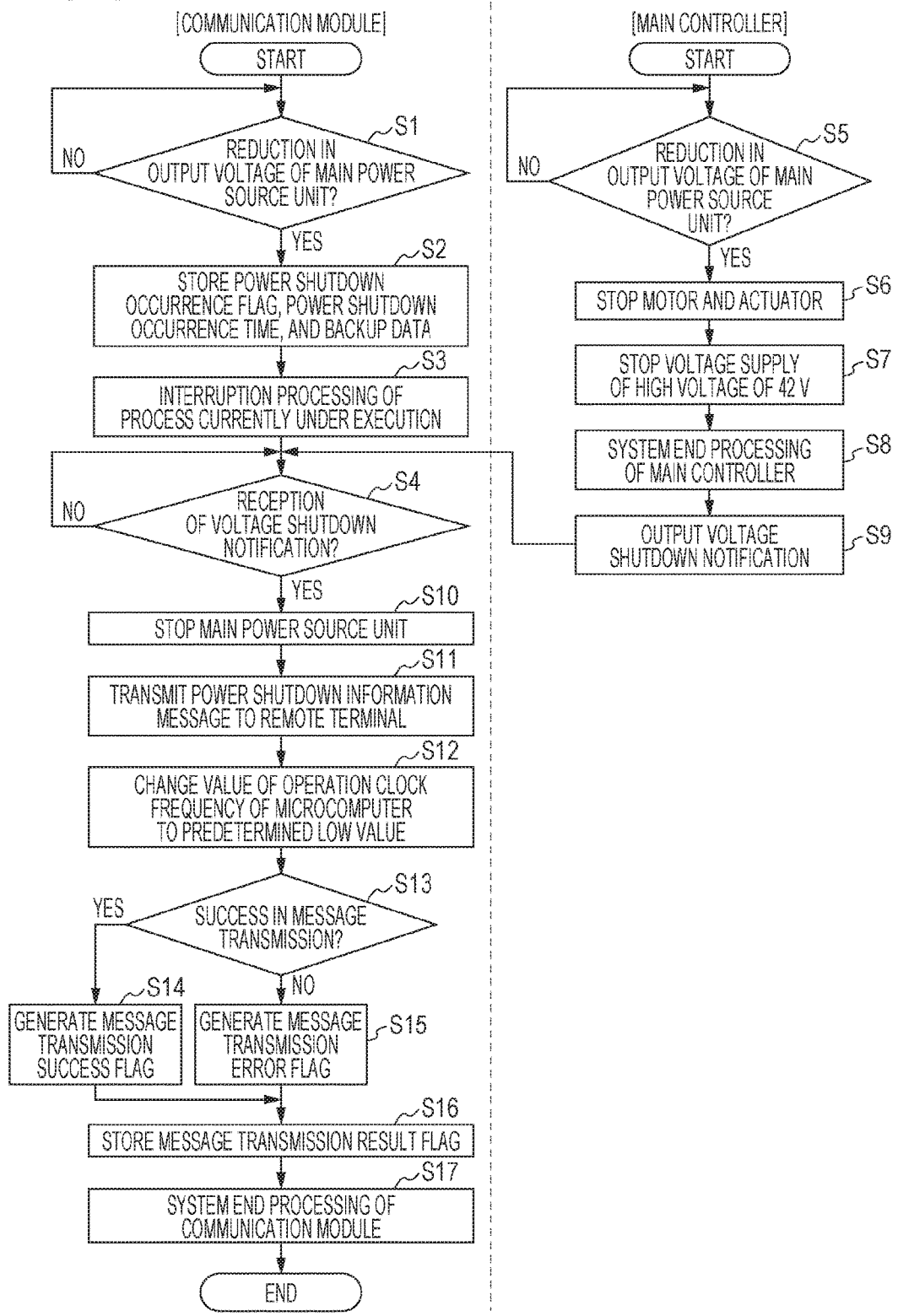
FIG. 3 is a flowchart illustrating operation when a power shutdown occurs.

With reference to FIGS. 3 and 4, operation of the printing apparatus 1 at a power shutdown and operation of the printing apparatus 1 at a power supply restart will be described. First, with reference to FIG. 3, the operation of the printing apparatus 1 at the power shutdown will be described. This operation is executed with the main power source unit 13 and the sub-power source unit 14 being in an active state. Although not shown in the figure, the printing apparatus 1 has a configuration in which during this operation, a power source supplying power to the communication module 32 is automatically switched from the sub-power source unit 14 to the bulk capacitor 15. That is, during this operation, the output voltage of the sub-power source unit 14 decreases, and at this time, the power source supplying power to the communication module 32 is automatically switched from the sub-power source unit 14 to the bulk capacitor 15, and the communication module 32 receives power supplied from the bulk capacitor 15 to perform processes including message transmission.

As illustrated in FIG. 3, when the power shutdown occurs, the communication module 32 and the main controller 22 detect a reduction in the output voltage of the main power source unit 13, and considering the reduction as a trigger, the communication module 32 and the main controller 22 start their processes. First, when the communication module 32 detects a reduction in the output voltage of the main power source unit 13 (S1: Yes), the communication module 32 stores a power shutdown occurrence flag showing the occurrence of a power shutdown, the power shutdown occurrence time (present time), and backup data in a semiconductor memory (S2). The term "backup data" here refers to information relating to a print job being executed and a print job history. Then, the communication module 32 performs interruption processing of interrupting a process currently under execution (S3), and transitions to a standby state for receiving a power shutdown notification from the main controller 22 (S4). The term "interruption processing" here refers to close processing to ensure security, maintain a mechanical state, and prevent file destruction, and includes, for example, processing to disable a motor drive circuit and connect a brake circuit, drive stop processing of a print medium holding solenoid, cache flush processing of cache data, close processing of a file system, etc.

When the main controller 22 detects a reduction in the output voltage of the main power source unit 13 (S5: Yes), the main controller 22 stops the motor and the actuator of the print engine 21 (S6) and stops power supply of a high voltage 42V to the print engine 21 (S7). Then, system end processing of the main controller 22 (end processing of the entire firmware) is performed (S8). When the system end processing of the main controller 22 has been terminated, a power shutdown notification is output to the communication module 32 (S9).

When the communication module 32 receives the power shutdown notification from the main controller 22 (S4: Yes), the communication module 32 stops the main power source unit 13 (power source cutoff) (S10). Then, the communication module 32 transmits a power shutdown information message to the remote terminal 6 (S11). That is, the communication module 32 transmits to the remote terminal 6 a power shutdown information message including that the printing apparatus 1 has stopped due to a power shutdown and the power shutdown occurrence time stored in the step (S2).

After transmitting the power shutdown information message to the remote terminal 6, the communication module 32 changes the value of the operation clock frequency of the microcomputer to the predetermined low value (S12). Then, the communication module 32 refers to data in a message information status registry, and determines a success or an error in the message transmission (S13). When it is determined, as a result of the determination, that the message transmission is successful (S13: Yes), the communication module 32 generates a message transmission success flag (S14), whereas when it is determined that the message transmission is failed (S13: No), the communication module 32 generates a message transmission error flag (S15).

When the message transmission result flag (message transmission success flag or the message transmission error flag) is generated, the generated message transmission result flag is stored in the semiconductor memory (S16). Then, system end processing of the communication module 32 (end processing of the entire firmware) is performed (S17), and the present operation is terminated.

Next, with reference to FIG. 4, the operation of the printing apparatus 1 at the time of the power supply restart will be described. The present operation is executed when power supply to the printing apparatus 1 is restarted to activate the sub-power source unit 14 and to activate the communication module 32.

As illustrated in FIG. 4, first, the communication module 32 performs an initializing process (S21). Then, the communication module 32 changes the value of the operation clock frequency of the microcomputer to the predetermined low value (S22) and stops the main power source unit 13 (S23). Note that at the time of the power supply restart, basically, the operation clock frequency of the microcomputer has the predetermined low value and the main power source unit 13 is in a stopped state, and therefore, these processes (S22 and S23) are preliminarily executed.

After stopping the main power source unit 13, the communication module 32 determines that the most recent stop of the printing apparatus 1 was caused due to a power shutdown by determination based on the power shutdown occurrence flag stored in the semiconductor memory (S24). Although not shown in the figure, when it is determined by the determination that the most recent stop of the printing apparatus 1 was not caused due to the power shutdown, the communication module 32 performs a normal activation process. That is, the communication module 32 transitions to a standby state for the power source switch 16 to be pressed. When the power source switch 16 is pressed, the communication module 32 activates the main power source unit 13, changes the value of the operation clock frequency of the microcomputer to a normal value, and executes the system activation process, and the main controller 22 executes the initializing process and the system activation process, and transitions to a normal mode.

The process returns to S24, and when it is determined that the most recent stop of the printing apparatus 1 was caused due to the power shutdown, the communication module 32 transmits a power supply restart information message to the remote terminal 6 (S25). That is, the communication module 32 transmits a power supply restart information message to the remote terminal 6. The power supply restart information message includes a message that supplying of power has been restarted, error information (error information of the printing apparatus 1) at the time of the power supply restart, a message that a power shutdown occurred at the most recent stop, the power shutdown occurrence time stored at step (S2) at the power shutdown, and a message transmission result based on the message transmission result flag stored in step (S16) at the power shutdown.

After transmitting the power supply restart information message to the remote terminal 6, the communication module 32 transitions to a standby state for an activation request from the remote terminal 6. That is, the communication module 32 transitions to the remote start standby mode. Then, the present operation is terminated. In this state, when the communication module 32 receives the activation request from the remote terminal 6, the communication module 32 activates the main power source unit 13. Then, the communication module 32 performs the initializing process of the print engine 21, thereby rendering the printing apparatus 1 ready to perform printing. Then, the communication module 32 transmits a message that the printing apparatus 1 is ready to perform printing to the remote terminal 6.

According to the configuration described above, the printing apparatus 1 is configured such that at the power supply restart after the power shutdown state, information of the power supply restart is transmitted to the remote terminal 6. Therefore, at the power supply restart after the power shutdown state, a user of the remote terminal 6 becomes aware of this event (that power supply has been restarted after the power shutdown). Therefore, the user of the remote terminal 6 can rapidly respond to this event, and for example, it is possible to reduce downtime due to the power shutdown as much as possible.

Moreover, in the printing apparatus 1, a power source section is divided into two sections, that is, the main power source unit 13 configured to supply power to the main controller 22 and the sub-power source unit 14 configured to supply power to the communication module 32. Therefore, information of the power supply restart can be transmitted to the remote terminal 6 with the main power source unit 13 being in a stopped state. That is, the information of the power supply restart can be transmitted to the remote terminal 6 with the print engine 21 and the main controller 22 being in a fully stopped state.

Moreover, the printing apparatus 1 is configured such that the main power source unit 13 is not immediately activated at the power supply restart, but information of the power supply restart is transmitted to the remote terminal 6, thereafter, an activation request from the remote terminal 6 is waited, and then, the main power source unit 13 is activated. Therefore, a user of the remote terminal 6 can confirm that the printing apparatus 1 is in a normal state, and then, the main power source unit 13 can be activated.

Furthermore, the printing apparatus 1 is configured such that error information at the time of the power supply restart as information of the power supply restart is also transmitted in addition to a message that the power supply has been restarted. Therefore, a user of the remote terminal 6 is made aware of the error information of the printing apparatus 1 at the power supply restart. Thus, at the power supply restart, the error status of the printing apparatus 1 can be rapidly resolved, and the operation of the printing apparatus 1 can be rapidly resumed.

Moreover, the printing apparatus 1 has a configuration in which when a power shutdown occurs, information of the power shutdown is transmitted to the remote terminal 6. Therefore, when the power shutdown occurs, a user of the remote terminal 6 is made aware of this event (that the power shutdown has occurred).

Note that in the above-described embodiment, when the printing apparatus 1 is stopped due to the power shutdown, the power shutdown information message is transmitted to the remote terminal 6, and when power supply is restarted, the power supply restart information message is transmitted to the remote terminal 6, but only one of these processes may be performed.

Moreover, in the above-described embodiment, the sub-power source unit 14 and the bulk capacitor 15 are used to supply power to the communication module 32. However, instead of the sub-power source unit 14 and the bulk capacitor 15, Power over Ethernet (PoE) via the communication interface 31 may supply power to the communication module 32. Moreover, the communication function section 12 may further include a Universal Serial Bus (USB) interface, and the VBUS power supply function of the USB may be used to supply power to the communication module 32. For example, when the printing apparatus 1 is to be stopped due to a power shutdown, power supply from the sub-power source unit 14 may be switched to power supply from the PoE or the VBUS power supply function.

Note that in the above-described embodiment, the communication module 32 is configured to activate the main power source unit 13 in response to an activation request from the remote terminal 6 with the main power source unit 13 being in a stopped state. However, the communication module 32 may stop the main power source unit 13 in response to a stop request from the remote terminal 6 with the main power source unit 13 being in an active state.

Moreover, in the above-described embodiment, the communication module 32 is configured to stand by for an activation request from the remote terminal 6, and then, to activate the main power source unit 13. However, the communication module 32 may activate the main power source unit 13 without standing by for the activation request from the remote terminal 6. For example, the communication module 32 may activate the main power source unit 13 immediately after transmitting the power supply restart information message, or the communication module 32 may activate the main power source unit 13 after a definite time has elapsed since the transmission of the power supply restart information message. Moreover, when a printing process interrupted during the most recent operation exists on activation of the main power source unit 13, the communication module 32 may restart the interrupted printing process without standing by for a request to restart the printing process.

In the embodiment, the printing apparatus 1 to which the remote terminal 6 is connectable via the Internet 4 is used. However, this embodiment does not intend to limit the configuration, and any configuration may be possible as long as the printing apparatus 1 to which the remote terminal 6 is connectable via a communication line is used. For example, a printing apparatus 1 to which the remote terminal 6 is connectable via a network, such as a Wide Area Network (WAN) or a Metropolitan Area Network (MAN), other than the Internet 4 may be used, or a printing apparatus 1 to which the remote terminal 6 is connectable via a telephone line may be used.

This application claims priority under 35 U.S.C. § 119 to Japanese Patent Application No. 2015-221878, filed Nov. 12, 2015. The entire disclosure of Japanese Patent Application No. 2015-221878 is hereby incorporated herein by reference.

What is claimed is:

1. A printing apparatus to which a remote terminal is connectable via a communication line, the printing apparatus comprising:
a communication section configured to perform data communication with the remote terminal; and
a communication control section configured to control the communication section, wherein at a power supply restart after a power shutdown state, the communication control section transmits information of the power supply restart to the remote terminal,
wherein on occurrence of a power shutdown, power supply from a sub-power source is stopped and power supply to a communication module of the communication control section is switched from the sub-power source to a bulk capacitor so as to enable transmission of the information of the power supply restart from the communication control section to the remote terminal.

2. The printing apparatus according to claim 1, further comprising:
a print section configured to perform printing on a print medium;
a print control section configured to control the print section;
a main power source section configured to supply supplied power to the print control section; and
a sub-power source section configured to supply supplied power to the communication control section, wherein
the communication control section is supplied with power from the sub-power source section at the power supply restart, with the main power source section being in a stopped state, to transmit the information of the power supply restart to the remote terminal.

3. The printing apparatus according to claim 2, wherein the communication control section transmits the information of the power supply restart to the remote terminal and then activates the main power source section in response to an activation request from the remote terminal.

4. The printing apparatus according to claim 1, wherein the information of the power supply restart includes error information at a time of the power supply restart.

5. The printing apparatus according to claim 1, wherein on occurrence of a power shutdown, the communication control section transmits information of the power shutdown to the remote terminal.

6. A printing apparatus to which a remote terminal is connectable via a communication line, the printing apparatus comprising:
a communication section configured to perform data communication with the remote terminal; and
a communication control section configured to control the communication section, wherein at a power shutdown state, the communication control section transmits information of the power supply to the remote terminal,
wherein on occurrence of a power shutdown, power supply from a sub-power source is stopped and power supply to a communication module of the communication control section is switched from the sub-power source to a bulk capacitor so as to enable transmission of the information of the power supply from the communication control section to the remote terminal.

7. An electric apparatus to which a remote terminal is connectable via a communication line, the electric apparatus comprising:
a communication section configured to perform data communication with the remote terminal; and a communication control section configured to control the communication section, wherein at a power supply restart after a power shutdown state, the communication control section transmits information of the power supply restart to the remote terminal, wherein on occurrence of a power shutdown, power supply from a sub-power source is stopped and power supply to a communication module of the communication control section is switched from the sub-power source to a bulk capacitor so as to enable transmission of the information of the power supply restart from the communication control section to the remote terminal.

* * * * *